United States Patent
Dicke

(10) Patent No.: US 9,885,440 B2
(45) Date of Patent: Feb. 6, 2018

(54) SYSTEMS FOR REMOVING A FLUID FROM A PIPELINE

(71) Applicant: Koch Pipeline Company, L.P., Wichita, KS (US)

(72) Inventor: Troy Dicke, Cottage Grove, MN (US)

(73) Assignee: Koch Pipeline Company, L.P., Wichita, KS (US)

( * ) Notice: Subject to any disclaimer, the term of this patent is extended or adjusted under 35 U.S.C. 154(b) by 0 days.

(21) Appl. No.: 15/185,572

(22) Filed: Jun. 17, 2016

(65) Prior Publication Data
US 2016/0369927 A1 Dec. 22, 2016

Related U.S. Application Data

(60) Provisional application No. 62/182,251, filed on Jun. 19, 2015.

(51) Int. Cl.
| F16L 55/18 | (2006.01) |
| F16L 55/07 | (2006.01) |
| F16L 41/02 | (2006.01) |
| F16K 5/06 | (2006.01) |

(52) U.S. Cl.
CPC ............... *F16L 55/07* (2013.01); *F16K 5/06* (2013.01); *F16L 41/02* (2013.01)

(58) Field of Classification Search
CPC . F16L 41/04; F16L 41/06; F16L 55/07; F16L 55/124; Y10T 137/612; Y10T 137/6123
USPC ......................................... 137/317, 318, 320
See application file for complete search history.

(56) References Cited

U.S. PATENT DOCUMENTS

| | | | | |
|---|---|---|---|---|
| 1,181,910 A * | 5/1916 | McGilvray | ............. | F16K 35/10 137/15.01 |
| 3,995,655 A * | 12/1976 | Sands | ...................... | F16L 41/06 137/318 |
| 4,155,372 A * | 5/1979 | Mills | ........................ | F16T 1/00 137/1 |
| 4,730,636 A * | 3/1988 | Volgstadt | ................ | F16L 41/06 137/15.14 |
| 5,074,526 A * | 12/1991 | Ragsdale | ................ | F16L 41/06 137/15.17 |
| 5,105,844 A * | 4/1992 | King, Sr. | .............. | F16L 47/345 137/15.14 |
| 5,241,981 A * | 9/1993 | Ahern | ..................... | F16K 17/02 137/318 |
| 5,694,972 A * | 12/1997 | King | .................... | A01G 25/023 137/318 |
| 5,924,436 A * | 7/1999 | Kitani | ....................... | E03B 9/02 137/15.09 |
| 6,341,619 B1 * | 1/2002 | Beninga | .................. | E03B 7/072 137/318 |
| 6,491,057 B1 * | 12/2002 | Collins | ................... | F16L 41/04 137/15.14 |
| 7,219,684 B2 * | 5/2007 | Dabir | .................... | A01G 25/023 137/318 |

(Continued)

*Primary Examiner* — Reinaldo Sanchez-Medina

(57) ABSTRACT

Provided herein is a system for removing fluids, for example petroleum products, from a pipeline while providing a fluidic seal between the fluids contained within the pipeline and the external environment thereby preventing leaking or escape of hazardous gases. The provided system is versatile and be utilized with many valve configurations and pipeline systems. Further, the system may be used on any fluid in which the release of fumes or gases is a concern.

11 Claims, 7 Drawing Sheets

(56) References Cited

U.S. PATENT DOCUMENTS

| | | | | |
|---|---|---|---|---|
| 7,722,298 B2* | 5/2010 | Russell | ............... | F16L 41/06 137/318 |
| 2008/0121284 A1* | 5/2008 | Knaus | ............... | F16L 41/12 137/15.14 |

* cited by examiner

SYSTEMS FOR REMOVING A FLUID FROM A PIPELINE

RELATED APPLICATIONS

This application claims benefit of priority to U.S. Provisional Patent Application No. 62/182,251 filed Jun. 19, 2016.

BACKGROUND

Various modalities exist for the efficient transportation of petroleum products, such as crude oil, gasoline, chemicals, and natural gas. Pipelines, rail cars, tankers ships, and trucks all work in harmony in the transportation network to deliver energy to the consumer. North America alone depends on over 185,000 miles of liquid petroleum pipelines, 320,000 miles of gas transmission lines, and more than 2 million miles of gas distribution pipelines. These pipelines constitute the dominant mode of petroleum product transportation.

Ideally, the pipeline is constantly transporting petroleum products with little or no downtime, but transportation may stop for maintenance or repair. Further, some pipelines are taken out of service when no longer needed. In these situations, it is sometimes necessary to remove the petroleum products from the pipeline.

One method for the removal of liquid petroleum from a pipeline is by pumping. This is problematic when the liquid diminishes to a level such that the pump mechanism begins to receive air or other gas causing cavitation. Various techniques are employed to prevent cavitation, for example, using a "pig" to flush the remaining petroleum through the pipeline and into the vacuum system. Pigs have significant drawbacks, however, because they are costly and time consuming to insert and remove from the pipeline. Another removal method is to insert a tube or pipe through a valve of the pipeline and attaching the vacuum system to the tube or pipe using a flexible tube. However, in order for the tube to fit through the valve and flange, the diameter of the tube must be less than the valve opening, which exposes the fluid within the pipeline to the environment, potentially allowing the escape of petroleum vapors into the atmosphere. Moreover, if the liquid within the pipeline is pressurized, then liquid may escape.

SUMMARY

It can be seen from the foregoing that there remains a need in the art providing for the safe and efficient removal of fluids from pipelines while protecting the environment from the release of hazardous materials.

The presently disclosed instrumentalities overcome the aforementioned problems and advance the art by providing a system for removing petroleum products from a pipeline. This includes use of a fluidic seal between the fluids contained within the pipeline and the external environment. The provided system is advantageously versatile and may be utilized with many valve configurations and pipeline systems. Further, the system may be used to prevent the release of any gas or liquid of concern.

In one embodiment, a tubular body is provided for removing a fluid from a pipeline. The tubular body has two ends, each of the ends having at least one opening in fluidic communication with a flow passage running longitudinally through the tubular body to allow the longitudinal flow of fluid through the tubular body. A plug is configured to fit in a valve or flange of the pipeline, the plug having an interior channel configured to allow the tubular body to pass through the plug and creating a fluidic compression seal between the interior channel and an outer surface of the tubular body.

According to one aspect, a portion of the valve or flange may be threaded and a portion of the plug is threaded to permit advancement of the plug within a nipple extension under conditions of isolating internal pressure of the pipeline from atmospheric pressure.

In one aspect, a first end of the tubular body may be configured for positioning substantially adjacent to an interior surface of the pipeline. The first end of the tubular body may be formed along a plane with an angle set perpendicularly with respect to a longitudinal axis of the tubular body. Alternatively, the plane is orthogonal to the longitudinal axis of the tubular body, such as an angle selected from the group consisting of: 20, 30, 40, 50, 60, 70 and 80 degrees.

In one aspect, the fluidic seal may utilize threads in combination with at least one of a press fit, welding, a gasket, an O-ring or combinations thereof.

According to one aspect, the tubular body may be a tube or a pipe. The tubular body may have, for example, at least four openings at a first end of the tubular body. Each opening may communicate with internal flow passages running longitudinally through the tubular body, such as four internal flow passages in the case of four openings.

According to one embodiment, a method is provided for use of the aforementioned system in removing liquid from a pipeline under a condition of isolating internal pipeline pressure.

BRIEF DESCRIPTION OF THE DRAWINGS

FIG. 5A provides single opening at the end of the insert with a flat opening. FIG. 5B provides an angled end with a single opening at the end of the tubular body or pipe;

DETAILED DESCRIPTION

The instrumentalities described below teach by way of example and not by limitation. Accordingly, the discussion should not be used in a manner that unduly limits the described invention.

Figure 1:
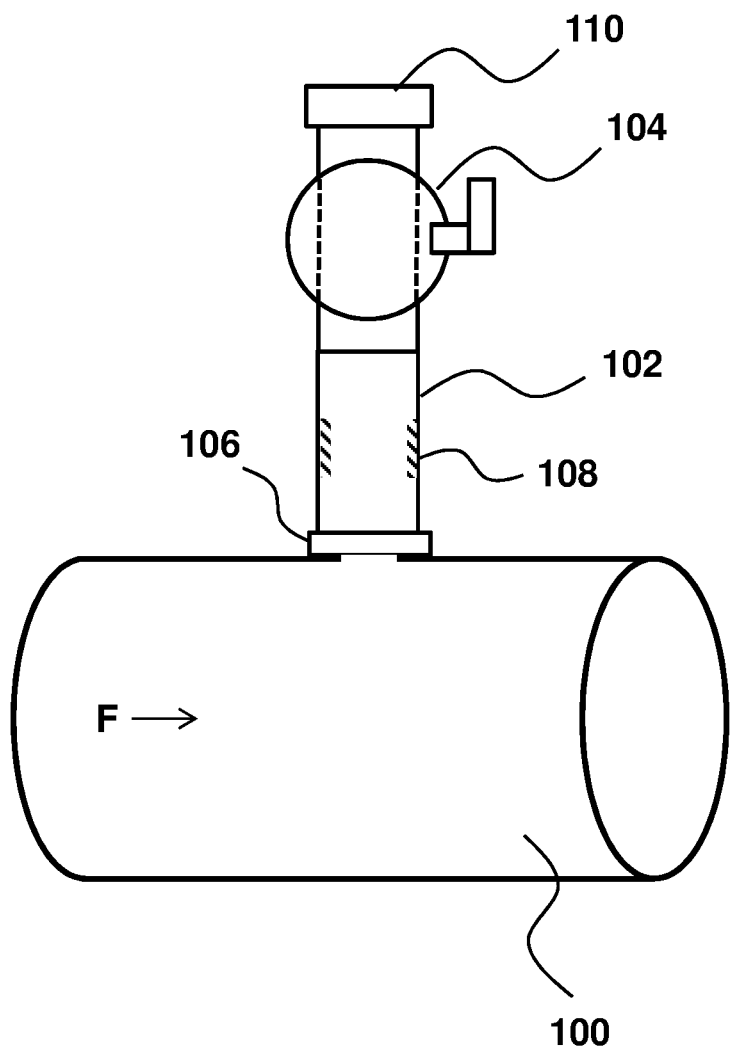
FIG. 1 provides a schematic of a drain system installed on a pipeline valve body.

FIG. 1 illustrates a pipeline drain valve arrangement for a pipeline 100. A flange 102 and valve 104 (e.g. a ball valve) are in fluid communication with the pipeline 100 through a connection 106. The connection 106 can be, for example, a weld between the flange 102 and the pipeline 100 achieved during a hot tapping operation. The flange 102 and valve 104 are orthogonal to the flow direction F of the pipeline 100. A seat 108, for example threads, is positioned on the inner diameter of the flange 102. The seat 108 can be used to create seal between the flange 102 and an inserted plug, for example, a completion plug which can be installed to seal the flange by threading into the seat 108 and prohibiting the flow of fluids into the valve 102. A completion plug, for example, may be inserted after a hot tapping operation is finished and may utilize the same device that drills into the pipeline during hot tapping to set the plug. Optionally, the seat 108 may be in the lower portion of the valve 104.

In some embodiments, by way of example, the flange 102 may be welded to the pipeline 100 in preparation for a hot-tap operation. Flanges of this nature are known to the art. Internally, but not shown in FIG. 1 is a tubular body, which may also be called a stinger and is capable of draining fluid from inside the pipeline 100. The tubular body (not shown) reaches to the internal bottom of the pipeline 100 for substantially complete drainage thereof. The flange 102, valve 104, connector 106, and seat 108 may have any dimension, but preferably have industry standard dimensions commonly in use. In many embodiments, for example, these may be standardized for two inch diameter couplings utilizing threads that are commonly employed for use in pipeline hot tap operations. Proper use and selection of these devices may be governed by governmental regulation and/or engineering design requirements that are well known to the art.

Fluid may be removed for repairs and maintenance through the flange 102 by opening valve 104. A common method for the removal of oil in the prior art was to attach a vacuum hose directly to the outlet 110 of the valve 104, open the valve 104 and apply suction to remove remaining hydrocarbons. As the fluid level in the pipeline 100 decreases, the vacuum system pulls gas (cavitates), and so the pipeline cannot be completely drained without use of the presently disclosed drain system 20.

Figure 2:
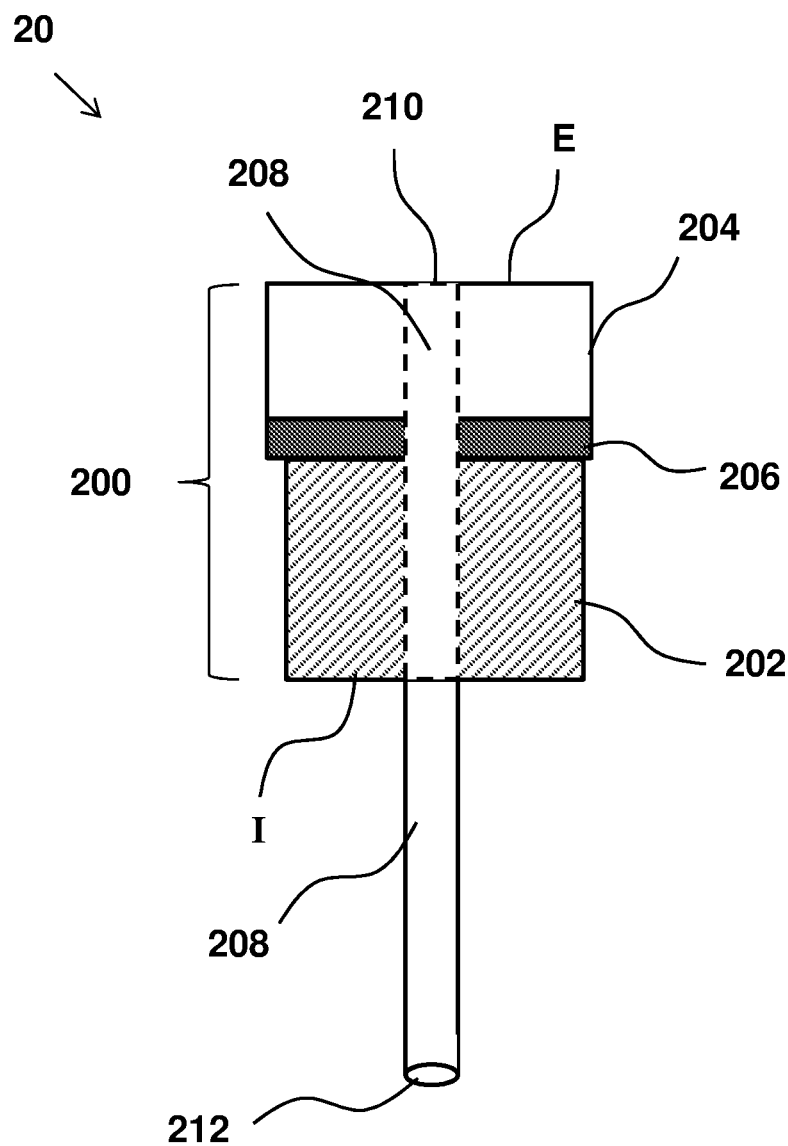
FIG. 2 provides a schematic of an embodiment of a plug and insert or "stinger" for placing within the drain system.

FIG. 2 shows one embodiment of the drain system 20. A plug 200 includes a plug end 202, an externally threaded plug body 204, and an optional elastomer 206 (e.g. an O-ring or gasket). External threads of the externally threaded plug body 204 sealingly engage complimentary threaded seat 108 of the flange 102 (see FIG. 1), forming a seal in which compression of the elastomer 206 slightly bulges the elastomer 206 to enhance the seal by forming a compression seal between the plug 200 and the internal diameter of flange 102 and/or seat 108.

The plug 200 also creates an internal seal along the length of the insert 208 adjacent to the threaded end 202, the plug body 204, and the elastomer 206. Thus, it will be appreciated that these first and second seals isolate an interior side I of drain system 20 from an exterior side E. Moreover, this isolation prevents gas or liquid from side I from crossing the drain system 20 to reach side E. If some leakage does occur, this may be prevented by further compression of elastomer 206 to enhance the integrity of the secondary seal between the plug 200 and the flange 102.

The plug 200 is similar in size and shape to a completion plug, however the tubular body 208 allows for the flow of fluids into the valve 104. The plug may be installed in a similar manner to that of a completion plug, for example using the T-101 Drilling Machine by T. D. Williams, as described in more detail below. The tubular body 208 may be referred to as a "stinger" because it forms a male member that enters into mating engagement with a complementary female through-receptacle or channel formed within the combined bodies of end 202, externally threaded plug body 204 and elastomer 206. The tubular body 208 and plug body 204 may be slidably engaged to permit relative motion between the two bodies, but the tubular body is preferably press-fit or welded in place. The length of tubular body 208 is preferably sufficient to reach the internal bottom of pipeline 100 (see FIG. 3) for drainage purposes. The top of the tubular body 210 is in fluidic communication with another system, such as the valve 104 which may be connected leading to a pump inlet (not shown) or vacuum source at its outlet 110. The tubular body 208 has an outside diameter that is approximately the same as the inside diameter of the plug 200. The tubular body 208 allows for the removal of fluid from the pipeline 100 interior on side I of drain system 20 through its lower end 212 Optionally, tubular body 208 may include a plurality of continuous openings contained within the diameter of the pipe, for example 4, 6, 8, 10, 12 and so-on.

Figure 5A:
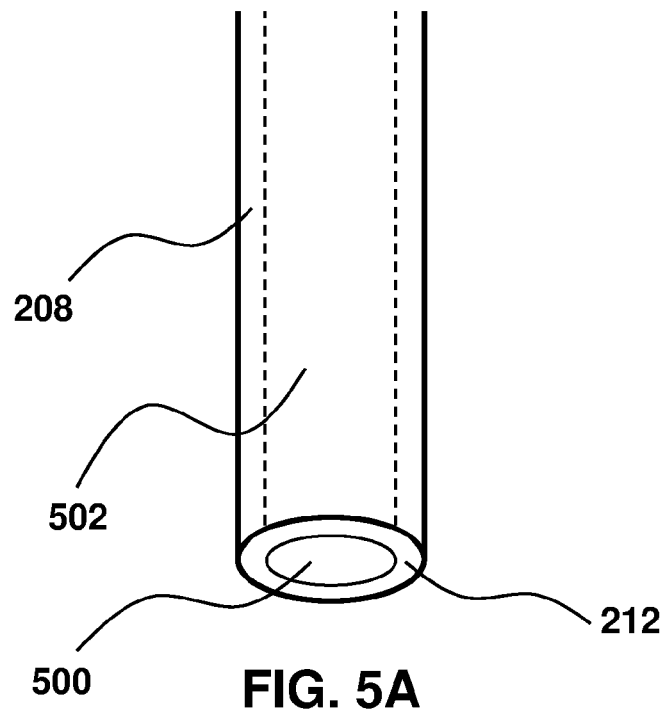
FIGS. 5A and 5B show example embodiments of the flow passage and openings near the end of the tubular body or pipe.
Figure 5B:
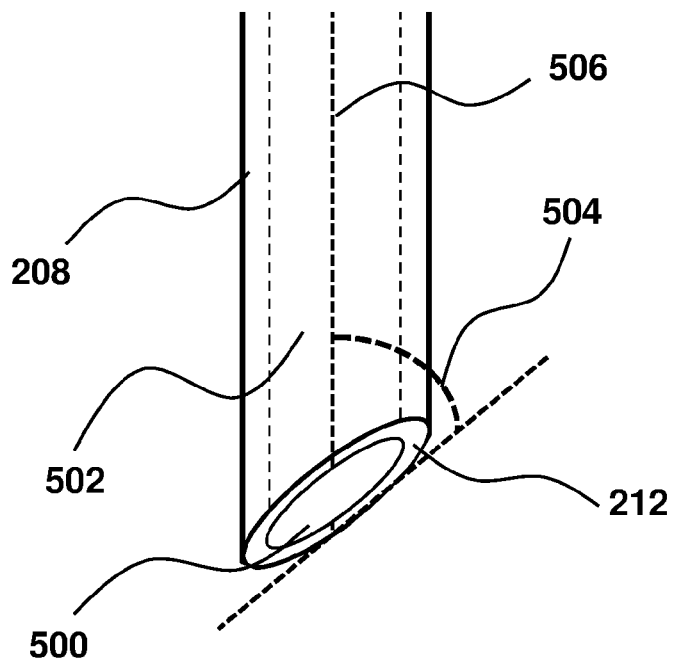

FIGS. 5A and 5B illustrate alternative options for the end 212 of tubular body 208 and integral flow passages 500, 502 at end 212. The respective flow passages 500, 502 are in fluidic communication with the pipeline interior at side I. While the version of end 512 shown in FIG. 5A is orthogonal to the axis of elongation in tubular body 208. FIG. 5B provides an end of the pipe having an axial plane 504 that is at an oblique angle from the longitudinal axis 506 of the tubular body 208. The oblique angle is, for example, at 20, 30, 40, 50, 60, 70, or 80 degrees from the longitudinal axis 506 provided as a dashed line in FIG. 5B.

Figure 3:
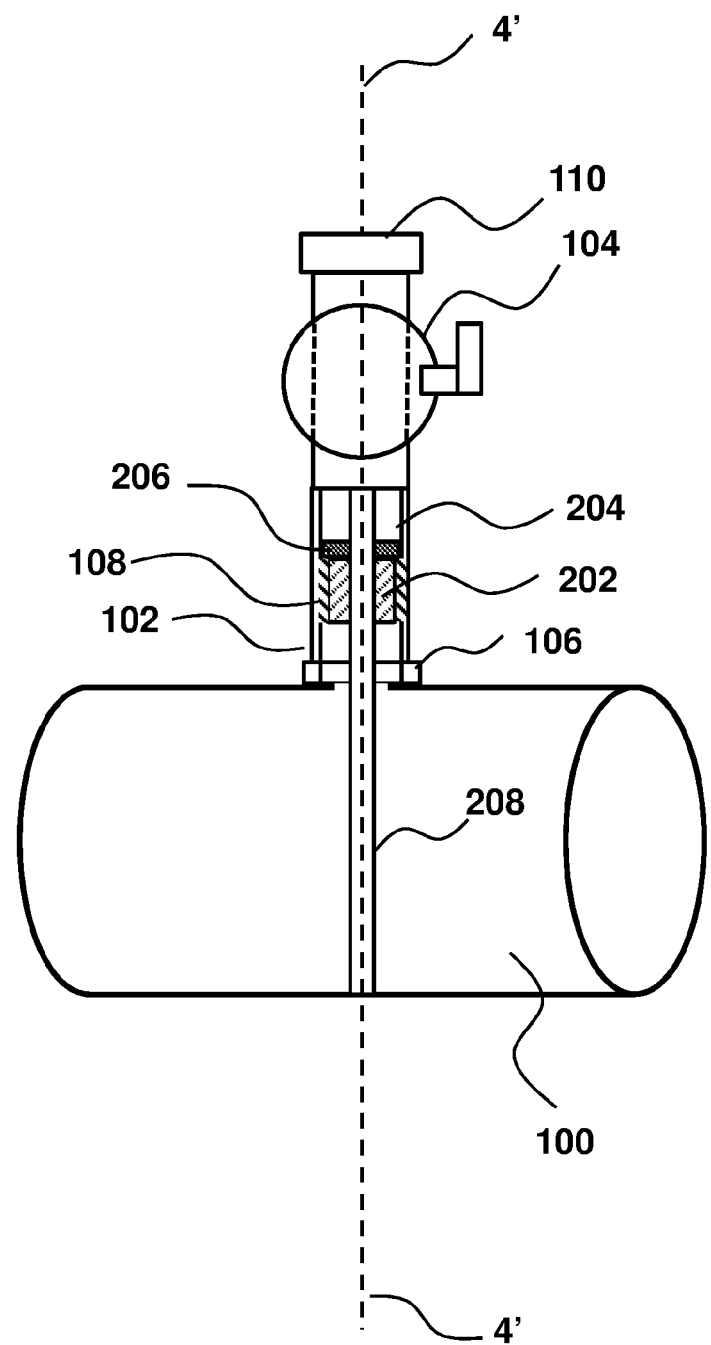
FIG. 3 shows the drain system with the plug and stinger installed.
Figure 4:
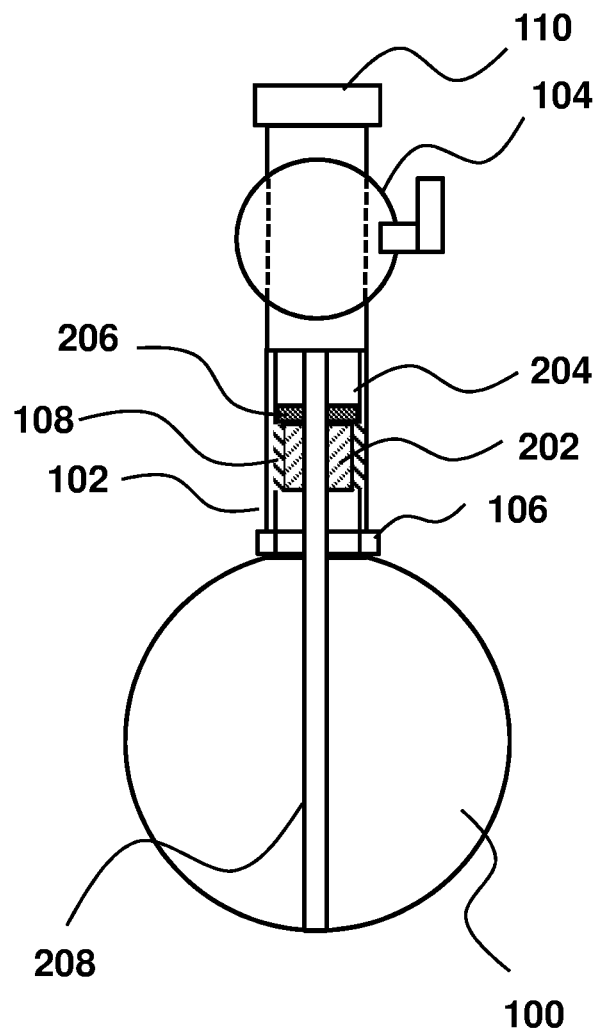
FIG. 4 a section view taken along line 4'-4' of FIG. 3.

FIGS. 3 and 4 show the drain system 20 in different environments of use. While the drain system 20 may be used in combination with any pipeline valve, illustrated is a ball valve 104 with dashed lines representing the valve 104 internal passage. For example, as shown in FIGS. 3 and 4, the drain system 20 is threadably received in seat 108 of flange 102 in fluid communication with pipeline 100. The drain system 20 separates ball valve 104 from the pipeline 100. Thus, the ball valve 104 may be opened to drain the interior of pipeline 100 through the tubular body 208 through ball valve 104 and the plug 200 for more complete draining of liquids from within pipeline 100. Thus, the drain system may be inserted into any flange or valve along the length of pipeline 100, including added valves or sleeves, for example by use of a stopple.

Figure 6:
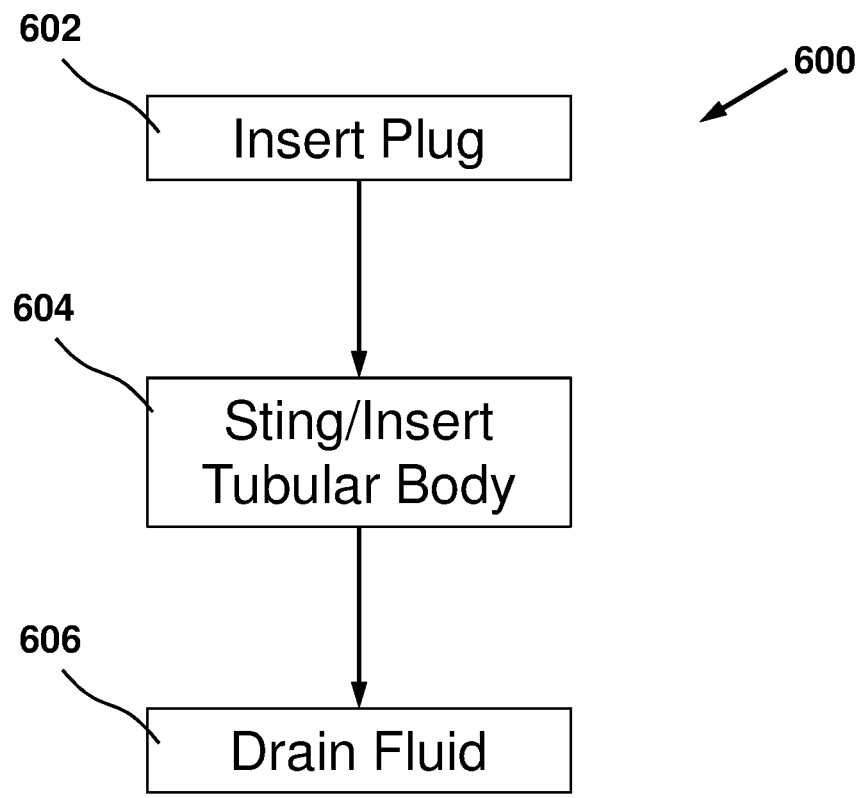
FIG. 6 is a process diagram showing use of the drains system according to one embodiment.

FIG. 6 demonstrates a method 600 of using the drain system 20 according to one embodiment. The plug 22 is inserted 602 into a flange or valve of a pipeline, such as flange 60 or ball valve 62 associated with pipeline 62, forming the second seal described above. The tubular body 36 may then be inserted 604 as a stinger into channel 42, forming the first seal described above. It is then possible to drain 606 fluid from within the pipeline. Where the plug 22 is inserted into a valve, such as ball valve 19 in consequence of step 602, the valve may be used to pressure-isolate the pipeline interior from atmosphere, such that it is possible to sting into a pressurized pipeline.

It will be appreciated that the drain system 20 is may be made of a unitary piece of metal or elastomer. For example, with plug end 202, plug body, 204 and elastomer 206 may be made of a unitary construction formed as a single piece of metal or elastomer in low pressure applications where it is unnecessary to tighten plug ends for bulging of elastomer 206.

Metals or other materials that do not corrode in petroleum products can be used in the manufacture the tubular body 208 and plug 200. Such metals include steel (including carbon steel, Hastaloy, and stainless), aluminum, aluminum alloys, titanium, and combinations thereof. Non-metal materials include ceramic, carbon fibers, nylon, propylene, ethylene, and polyester. The tubular body 208 and plug 200 may also be a mixture of metals and non-metals. For example, the interior of the elongated pipe can comprise a metal, while the exterior of the pipe that is inserted through the valve and flange a non-metal. A non-metal exterior may help prevent cold welding of the tubular body to the plug in situations where the pipe and plug have the same diameter.

Figure 7:
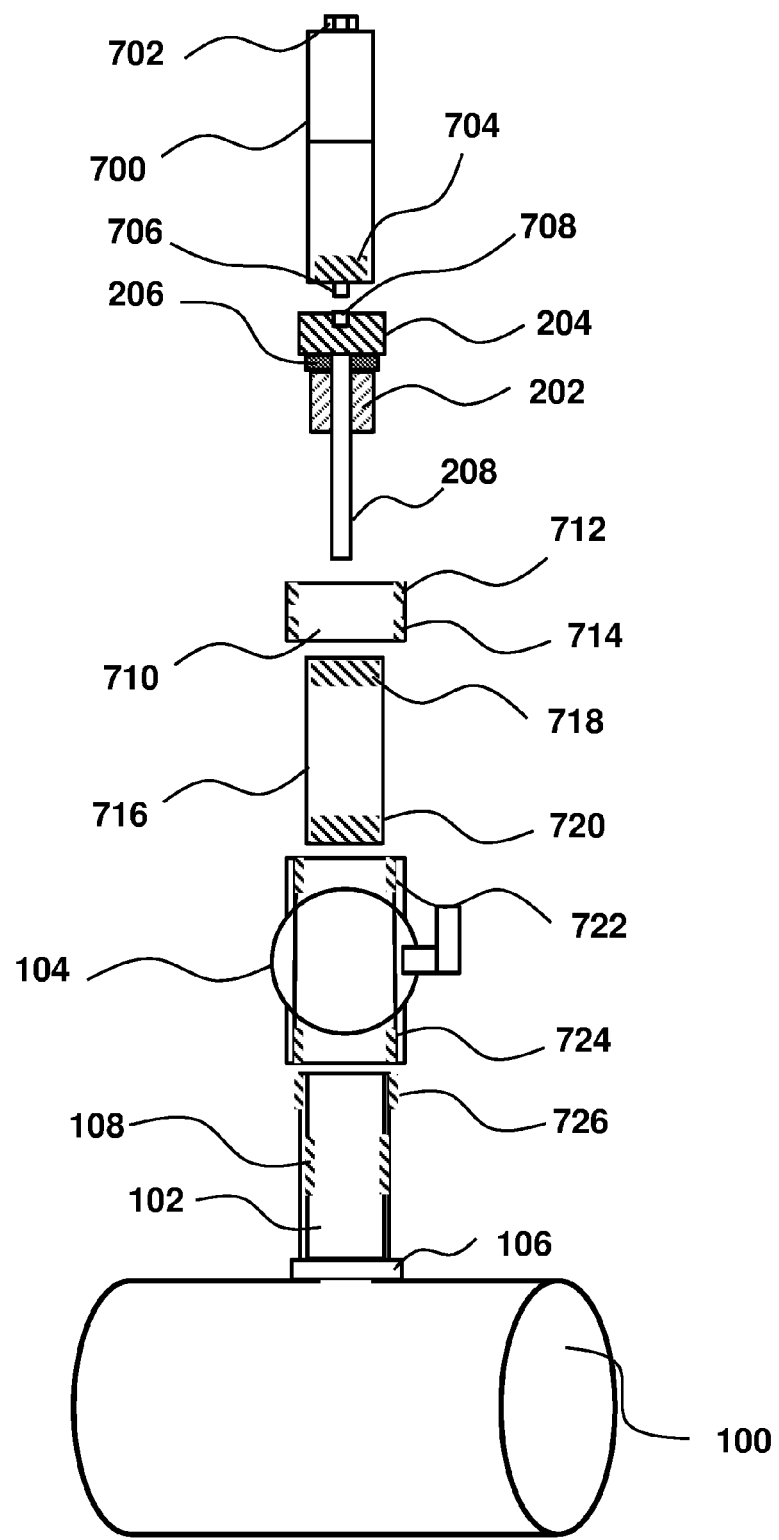
FIG. 7 shows the drain system according to one embodiment.

FIG. 7 shows an assembly view of the presently disclosed instrumentalities according to one embodiment. As shown in FIG. 7, a flange 102, connector 106, seat 108, and valve 104 have been connected to pipeline in a hot-tap operation as is known to the art. A hot-tap drilling tool 700, such as the T101 made by T D Williamson, permits drilling under a closed pressure system by use of the drilling tool 700 to penetrate and form an opening through the exterior wall of pipeline 100 beneath flange 102. In this drilling operation, the tool 700 penetrates valve 104 in the open position and extends through seat 108 before drilling through pipeline 100. The tool 700 may then be retracted to a position above valve 104, and the valve 104 is then closed to isolate pressure inside the pipeline 100. The tool 700 may then be unthreaded from valve 104. This permits valve 104 to be coupled with a system (not shown), such as a vacuum system, to drain liquid from inside pipeline 100. The valve 104 may be removed at this time, but a best practice is to keep the valve 104 in place in case pressure unexpectedly returns to spike within the pipeline 100. It will be appreciated that the valve 104 is depicted as a ball valve, but may alternatively be a gate valve, such as sandwich valve as is known in the art.

Successive parts are then successively coupled upward from valve 104 utilizing threaded couplings to install exterior male threads 720 of extension nipple 716 within female internal threads 722 of valve 104. Upper male threads 718 of extension nipple 716 are received within internal female threads 714 of bushing 710, and internal female threads 712 of the bushing 710 connect with external male threads of the threaded plug end 202. In the embodiment of FIG. 7, the plug end 204 has a square drive hole 708 for mating engagement with a square drive 706, which forms part of the tool 700. The plug end 204 also has internal female threads for receiving external male threads 704 of the tool 700. A hex drive shaft 702 extends through tool 700 and is capable of turning the square drive 706 and plug body 204.

Rotation of the hex drive 702 is capable of advancing the square drive 706 of tool 700 to a distance substantially below external threads 704. Thus, the extension bushing 716 is also provided with female internal threads (not shown). The externally threaded plug body 204 may, consequently, be advanced through the extension nipple 716 until tubular body 208 reaches the internal bottom of pipeline 100. As depicted, the length of tubular body 208 is not to scale, and in use is longer than is depicted in FIG. 7, such that the tubular body 208 is capable of performing this task. It follows that the extension nipple 716 and other parts of FIG. 7 are, in use, of sufficient length to permit the tubular body 208 to reach the internal bottom of pipeline 100.

Once the drain system is assembled as shown in 'FIG. 7 and torqued to design specification, valve 104 may be opened. Rotation of the hex drive 702 advances the externally threaded plug body 204 through the extension nipple 716 until the tubular body or stinger 208 reaches the internal bottom of pipeline 101. The system is pressure sealed to prevent unwanted release of internal pipeline liquids in case there might be an unexpected internal pressure spike within pipeline 100. If no such pressure spike exists, for example, as denoted on a pressure gage (not shown) on tool 700, then the tool 700 may be removed and the internal female threads of plug end 204 connected to, a conventional vacuum system (not shown) for complete drainage of pipeline 100 at this location.

Those skilled in the art will, appreciate that what is shown and described may be subjected to insubstantial changed without departing from the true scope and spirit of invention. Accordingly, the inventors hereby state their intention to rely as needed upon the Doctrine of Equivalents in protecting their rights to the invention.

I claim:

1. A drain system for removing a fluid from a pipeline comprising:
    a tubular body having two ends, each of said ends having at least one opening in fluid communication with a flow passage running longitudinally through said tubular body to allow the longitudinal flow of fluid through said tubular body; and
    a plug configured to fit through a valve of said pipeline for threadable engagement therewith, said plug having an interior channel configured to allow said tubular body to pass through said plug;
    wherein said plug is provided with structure including at least the threadable engagement to create a fluidic seal between said plug and said valve of said pipeline, thereby allowing flow of said fluid out of said pipeline through said tubular body but not allowing flow of fluid through said fluidic seal.

2. The drain system of claim 1, wherein said structure includes external threads on a body of the plug.

3. The drain system of claim 1, wherein the plug includes an elastomer that may be placed in compression by rotation of the plug.

4. The drain system of claim 1, wherein a first end of said tubular body is configured to be positioned substantially adjacent to an interior bottom surface of said pipeline.

5. The drain system of claim 4, wherein said first end is a plane with an angle set from a longitudinal axis of said tubular body.

6. The drain system of claim 5, wherein said plane is orthogonal to said longitudinal axis of said tubular body.

7. The drain system of claim 5, wherein said angle set from said longitudinal axis is selected from the group consisting of: 20, 30, 40, 50, 60, 70 and 80 degrees.

8. The drain system of claim 1, further including the pipeline.

9. The drain system of claim 1, wherein said fluidic seal is created by the threaded engagement in combination with a structure selected from the group consisting of a press fit, welding, an adhesive, a gasket, an O-ring or a combination thereof.

10. A method for the removal of a fluid from a pipeline comprising:
    providing a drain system according to claim 1;
    inserting the plug into the valve or flange of the pipeline to create the fluidic seal under conditions that isolate internal pressure of the pipeline, and
    draining fluid through the tubular body from within the pipeline.

11. The method of claim 10, wherein the pipeline has an interior that is over-pressurized with respect to atmospheric pressure, and the step of inserting the plug includes inserting the drain system into the valve while the valve pressure-isolates the pipeline from the atmosphere.

* * * * *